United States Patent
Griffin et al.

(10) Patent No.: US 11,832,019 B2
(45) Date of Patent: Nov. 28, 2023

(54) METHOD FOR HARMONIZING IMAGES ACQUIRED FROM NON OVERLAPPING CAMERA VIEWS

(71) Applicant: Connaught Electronics Ltd., Tuam (IE)

(72) Inventors: Mark Griffin, Troy, MI (US); Aidan Casey, Tuam (IE); Emre Turgay, Tuam (IE); Alex Perkins, Troy, MI (US)

(73) Assignee: Connaught Electronics Ltd., Tuam (IE)

(*) Notice: Subject to any disclaimer, the term of this patent is extended or adjusted under 35 U.S.C. 154(b) by 0 days.

(21) Appl. No.: 17/821,874

(22) Filed: Aug. 24, 2022

(65) Prior Publication Data

US 2023/0064558 A1 Mar. 2, 2023

(30) Foreign Application Priority Data

Aug. 24, 2021 (EP) ................................... 21192780

(51) Int. Cl.
*H04N 5/265* (2006.01)
*H04N 5/268* (2006.01)
(Continued)

(52) U.S. Cl.
CPC ............ *H04N 5/265* (2013.01); *G06V 10/25* (2022.01); *G06V 20/588* (2022.01); *H04N 5/268* (2013.01);
(Continued)

(58) Field of Classification Search
CPC ........ H04N 23/76; H04N 23/90; H04N 5/265; H04N 5/268; H04N 9/646; H04N 9/67;
(Continued)

(56) References Cited

U.S. PATENT DOCUMENTS

| | | | |
|---|---|---|---|
| 2016/0375904 A1* | 12/2016 | Satzoda | G06F 18/24 348/148 |
| 2019/0241126 A1 | 8/2019 | Murad et al. | |
| 2020/0349723 A1 | 11/2020 | Geva et al. | |

FOREIGN PATENT DOCUMENTS

| | | |
|---|---|---|
| DE | 102019133948 A1 | 6/2021 |
| WO | 2018/087348 A1 | 5/2018 |
| WO | 2021/032434 A1 | 2/2021 |

OTHER PUBLICATIONS

Janice Pan et al: "Rear-Stitched View Panorama: A Low-Power Embedded Implementation for Smart Rear-View Mirrors on Vehicles", 2017 IEEE Conference on Computer Vision and Pattern Recognition Workshops (CVPRW), Jul. 21, 2017 (Jul. 21, 2017), pp. 1184-1193, XP055557317, DOI: 10.1109/CVPRW.2017.157 (10 pages).

(Continued)

*Primary Examiner* — Sherrie Hsia
(74) *Attorney, Agent, or Firm* — Osha Bergman Watanabe & Burton LLP (57) ABSTRACT

An image processing method for harmonizing images acquired by a first camera and a second camera connected to a vehicle and arranged in such a way as their fields of view cover a same road space at different times as the vehicle travels along a travel direction is disclosed. The method includes: acquiring by a selected camera, a first image at a first time; selecting a first region of interest bounding a road portion from the first image; sampling the first region of interest; acquiring by the other camera, a second image in such a way that the road portion is included in a second region of interest; sampling the second region of interest; and determining one or more correction parameters for harmonizing images acquired by the first and second cameras, based on a comparison between the image content of the first and second regions of interest.

16 Claims, 7 Drawing Sheets

(51) Int. Cl.
*G06V 10/25* (2022.01)
*G06V 20/56* (2022.01)
*H04N 23/76* (2023.01)
*H04N 23/90* (2023.01)
*H04N 9/64* (2023.01)
*H04N 9/67* (2023.01)
*H04N 9/68* (2023.01)
*B60R 1/22* (2022.01)

(52) U.S. Cl.
CPC ............... *H04N 9/646* (2013.01); *H04N 9/67* (2013.01); *H04N 9/68* (2013.01); *H04N 23/76* (2023.01); *H04N 23/90* (2023.01); *B60R 1/22* (2022.01); *B60R 2300/105* (2013.01); *B60R 2300/20* (2013.01); *B60R 2300/304* (2013.01)

(58) Field of Classification Search
CPC ........ H04N 9/68; G06V 20/588; G06V 10/25; G06V 10/759; B60R 1/22; B60R 2300/105; B60R 2300/20; B60R 2300/304
USPC .................................. 348/148, 143, 169, 118
See application file for complete search history.

(56) References Cited

OTHER PUBLICATIONS

Extended European Search Report in corresponding European Application No. 21192780.1-1210, dated Feb. 16, 2022 (10 pages).
Office Action Issued in Corresponding Korean Application No. 2022-0105469, dated Aug. 31, 2023. ( 26 pages with English Translation).

* cited by examiner

METHOD FOR HARMONIZING IMAGES ACQUIRED FROM NON OVERLAPPING CAMERA VIEWS

FIELD

The present invention relates to a method for harmonizing images acquired by two or more cameras connected to a vehicle and having fields of view that do not overlap.

BACKGROUND

It is known for vehicles to be provided with multi-camera automotive vision systems, including a number of cameras disposed at the front, rear and on the left and right side mirrors of the vehicle for capturing images of the environment surrounding the vehicle.

Images from these cameras are typically relayed to an electronic control unit, ECU, comprising a processor which, among various tasks, processes the images before providing one or more processed images to a display or windscreen located within a cabin of the vehicle, to provide assistance to the driver of the vehicle.

Different types of views can be generated by the vehicle ECU by combining the input images received from the multiple cameras, before being displayed to the driver or used for other applications, such automatic or semi-automatic vehicle operations. In particular, regions of interest from the input camera images can be first remapped to a targeted viewport and then merged, thus generating a mosaic image that represents a view from a particular selected 3D point in the environment surrounding the vehicle. For example, a virtual camera can be placed above the vehicle, looking from a top central position, and input camera textures corresponding to regions of interest of the camera images are projected to a surface viewport that corresponds to a flat 2D plane, and merged to generate a mosaic view showing an upper side of the vehicles as well as the environment surrounding the vehicle, that is usually referred to as a top-view (or bird eye view). Other merged views can be generated using the rendering capabilities of the vehicle ECU, such as multi dimensional views (e.g., 3D Bowl views, where a bowl shaped projective 2D is used instead of a flat 2D plane).

Each vehicle camera has its own lens, image sensor and, in many implementations, an independent image signal processing chain (therefore, the vehicle cameras can have a different exposure or gain control, a different white balance or the like). Furthermore, each vehicle camera is facing in different directions and is seeing different areas of the vehicle environment.

As such, brightness and colour hues can be slightly different for the images acquired by each vehicle camera, due the limitations (lens, image sensor, etc) and different orientations of the vehicle cameras. These slight differences in colour and brightness negatively affect the visual quality of displayed merged views, thus jeopardizing the driver's illusion of a view corresponding to a virtual camera in a 3D point surrounding the vehicle.

In order to improve the visual quality of merged views, brightness and colour harmonization is generally applied. In particular, harmonization between two vehicle cameras having overlapping field of views is achieved using a common ground region captured by the camera as a reference for harmonization. For instance, harmonization between the front and right side mirror cameras can be achieved using a corner road region, where the fields of view of these cameras overlap.

For example, WO2018/087348 (Ref: SIE0426) discloses a method for harmonizing brightness and colour of a composite image of the environment surrounding a vehicle, using histograms representing the luminance Y and chromatic values U, V of the merged input images.

It is further known for vehicles to be provided with hitches allowing them to tow a trailer. It will be appreciated that trailers (as well objects transported by the trailer, where applicable) lead to large blind-spots for a driver as they are not able to see most areas around the trailer and in particular, it can be difficult for unskilled drivers to attempt to reverse a vehicle with a trailer without assistance. It is therefore known for such trailers to also incorporate a rear camera directed rearwardly of the trailer (as well as in some cases trailer side cameras pointing outwardly from respective sides of the trailer). Images from these cameras can be acquired by a controller within the trailer and provided to the vehicle ECU to produce an enhanced display to assist a driver. In some cases, any trailer camera can be connected directly to the vehicle ECU.

For example, the vehicle ECU can generate an invisible trailer view by merging images acquired by the vehicle rear camera and the trailer rear camera. In particular, the invisible trailer view is built by remapping regions of interest of the images acquired by the rear cameras to a target viewport (Invisible Trailer viewport), and merging the remapped regions of interest. In this way, a rear view is provided to the driver, via the vehicle display or windscreen, where the trailer becomes virtually invisible. For example, WO2021/032434 (Ref: 2019PF00307) discloses generating a first camera image from a rear camera of a vehicle and a second camera image from a rear camera of a trailer hitched to the vehicle. An invisible trailer view is generated by superimposing these camera images, such that the second camera image covers a subsection of the first camera image depending on a hitch angle between the vehicle and the trailer.

Other applications can require a merging of the images acquired by the rear cameras of the vehicle and hitched trailer. For example, DE102019133948 (Ref: V25-2103-19DE) discloses the use of the multiple cameras of a vehicle and trailer combination to construct a 3D view of the environment surrounding the vehicle and trailer combination, for display to a driver.

In the merged views generated for assisting a driver of a vehicle combined with a trailer, brightness and/or colour disparities can be visible to the driver in the merged areas of the images acquired by the rear cameras of the vehicle and hitched trailer. However, these cameras are positioned such that their fields of view do not overlap in such a way as to cover a common ground portion. Thus, there is no reliable common reference for harmonizing the rear cameras of the vehicle and hitched trailer.

Similarly, there is no common ground available as a reliable reference for harmonizing images acquired by the rear and front cameras of a vehicle (with or without trailer).

SUMMARY

According to the present invention there is provided a method according to claim 1, for harmonizing images acquired by a first camera and a second camera connected to a vehicle, having fields of view that do not overlap at a same time.

Embodiments of the invention are based on the realization that, although the first and second cameras can not capture a same road portion at a given time, the first and second camera can capture a same road portion at different times as the vehicle proceeds along a travel direction and this can be advantageously used as reliable reference for harmonizing a view including merged images captured by the first a second cameras. For example, the harmonized view can be an invisible trailer view, in embodiments where the first and second cameras are a rear camera of a vehicle and a rear camera of a trailer towed by the vehicle. In other embodiments, the first and second cameras can be the front and rear cameras of a vehicle.

In more detail, embodiments of the invention involve sampling at least one first region of interest, ROI, from a first image acquired, at a first time, by one of the first and second cameras selected based on a determined direction of the vehicle. The first ROI is defined in the first image to include a reference road portion within the captured scene. A second ROI is sampled from a second image acquired by the other camera at a second time such that, according to a monitored travelled distance of the vehicle after the first time, the second ROI can also include the reference road portion. One or more correction parameters for harmonizing images acquired by the first and second cameras are then determined based on a comparison between the image data within the sampled ROIs.

In some embodiments, the image data within the first and second ROIs is compared after conversion into a YUV format. In these embodiments, a difference between luma values Y estimated for the first and second ROIs is compared to a threshold with the purpose of determining whether these ROIs actually include a same road reference portion, based on the realization that if the ROIs include different objects within the imaged scene (e.g. because an object has moved onto or over or left the reference road portion before the acquisition time of the second image), the difference between the estimated luma values Y is significant.

Further aspects of the invention include an automotive multi-camera vision system, a combination of a vehicle and trailer or a vehicle, and computer program product configured to execute the method according to the invention.

BRIEF SUMMARY OF THE DRAWINGS

Embodiments of the invention will now be described, by way of example, with reference to the accompanying drawings, in which.

DESCRIPTION OF THE EMBODIMENTS

Figure 1:
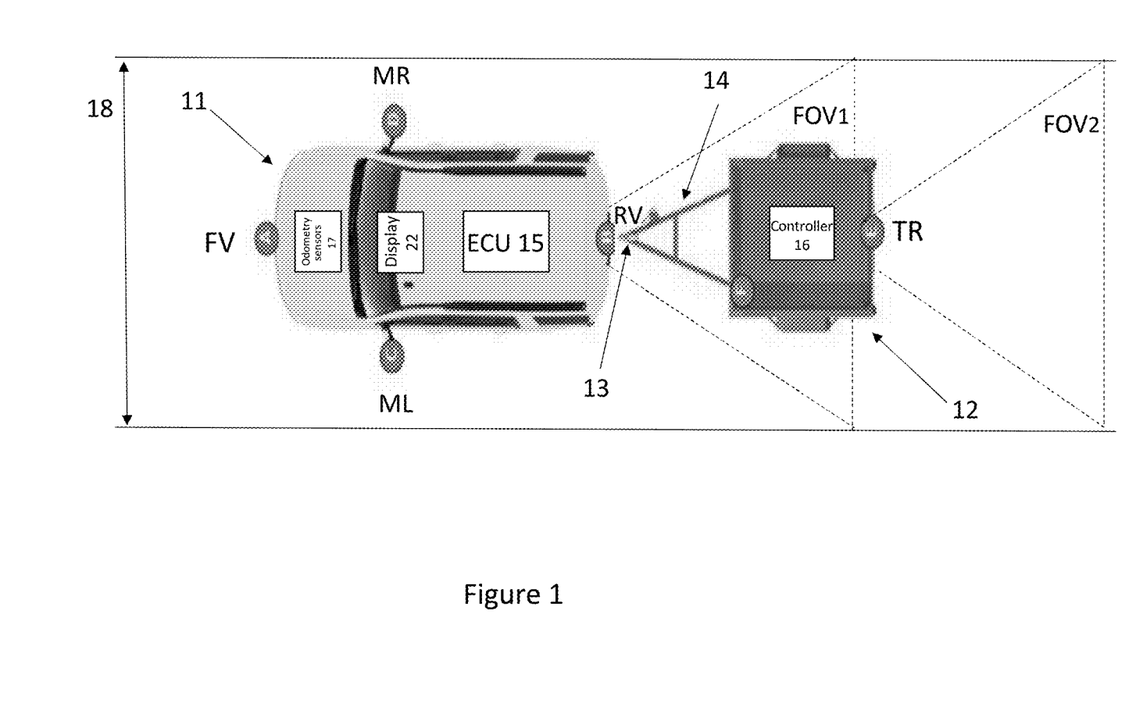
FIG. 1 illustrates a combination of a vehicle with a trailer, including a multi-camera vision system according to the present invention.

Referring now to FIG. 1, there is shown a combination of a car 11 with a trailer 12, including a multi-camera vision system configured to perform an image harmonization method according to an embodiment of the present invention.

The car 11 is provided with a hitch 13 allowing the car 11 to tow objects, such as the trailer 12 illustrated in FIG. 1. In particular, the trailer 12 is hooked to the hitch 13 via a drawbar 14, in such a way that a hitch angle can be present between the car 10 and the trailer 12 (when the car 10 is towing the trailer 12 moving along a curved trajectory).

It is to be noted that the trailer 12 illustrated in FIG. 1 is just a non-limitative example of several types of trailers that can towed by the car 10—other examples include a caravan or a horsebox. As such, in the present application any object towed by the car 10 is referred to as a trailer. As such, in cases where a trailer is used as a platform for transporting an object that occludes the rear view of the driver (e.g., a boat trailer carrying a boat, or a bike trailer carrying bikes), for the purposes of the present application the transported object is considered as part of the towed trailer. It is to be noted the car 11 illustrated in FIG. 1 is also just a non-limitative example of several types of vehicles that can tow a trailer (such as a truck or tractor). Thus, the connecting means for connecting the trailer to the vehicle can be different than the hitch 13 and drawbar 14 illustrated FIG. 1.

The multi-camera vision system includes a plurality of cameras disposed at the front (FV camera), rear (RV camera) and on the left and right side mirrors (ML and MR cameras) of the vehicle for capturing images of the environment surrounding the vehicle. The side cameras need not necessarily be located on the mirrors, and these can be located at any location suitable for acquiring an image from the environment to the sides of a vehicle.

The system further includes a trailer rear camera (TR camera) directed rearwardly of the trailer 12 (and in some cases, can also include side cameras pointing outwardly from respective sides of the trailer 12). As such, as illustrated in FIG. 1, the fields of view $FOV_1$ and $FOV_2$ of the vehicle camera RV and trailer camera TR do not overlap, at a given time, on a common portion of a road 18 along which the car 11 is travelling. This does not exclude that $FOV_1$, $FOV_2$ can overlap at some regions of the scene, but these common regions are not uniform and variable and therefore, are not reliable for image harmonization of the cameras RV, TR.

The system further comprises a vehicle ECU 15 running an application configured to receive images acquired by the vehicle cameras FV, RV, MR, ML, and a controller 16 within the trailer 12 that is configured to collect the images acquired by the trailer camera TR (as well by the trailer side cameras, if present). The images collected by the trailer controller 16 are streamed or otherwise provided, through either a wired or wireless connection, to the vehicle ECU 15. In some cases, any trailer camera can be connected directly to the vehicle ECU 15.

A processor of the vehicle ECU 15 is configured to process the images received from the vehicle and trailer cameras FV, RV, MR, ML, TR with the purpose of providing processed images to a display 22 or windscreen located within a cabin of the car 11. Such camera information can also be processed by the ECU 15 to perform autonomous or semi-autonomous driving, parking or braking of the vehicle as well as for example, storing streams of images captured by one or more of the cameras as dashcam or security footage for later retrieval.

The ECU 15 (or another processing unit within the car 11) can also estimate a distance travelled by the car 11 over time, by processing sensor data provided by odometry sensors (schematically represented and cumulatively indicated with numeral reference 17 in FIG. 1). For example, the odometry sensors 17 can include sensors that measure the space travelled by some of the wheels and steering angle. In addition or as an alternative to using the sensor data provided by the sensors 17, the change in position of the car 11 over time can be estimated using GPS tracking.

Figure 2:
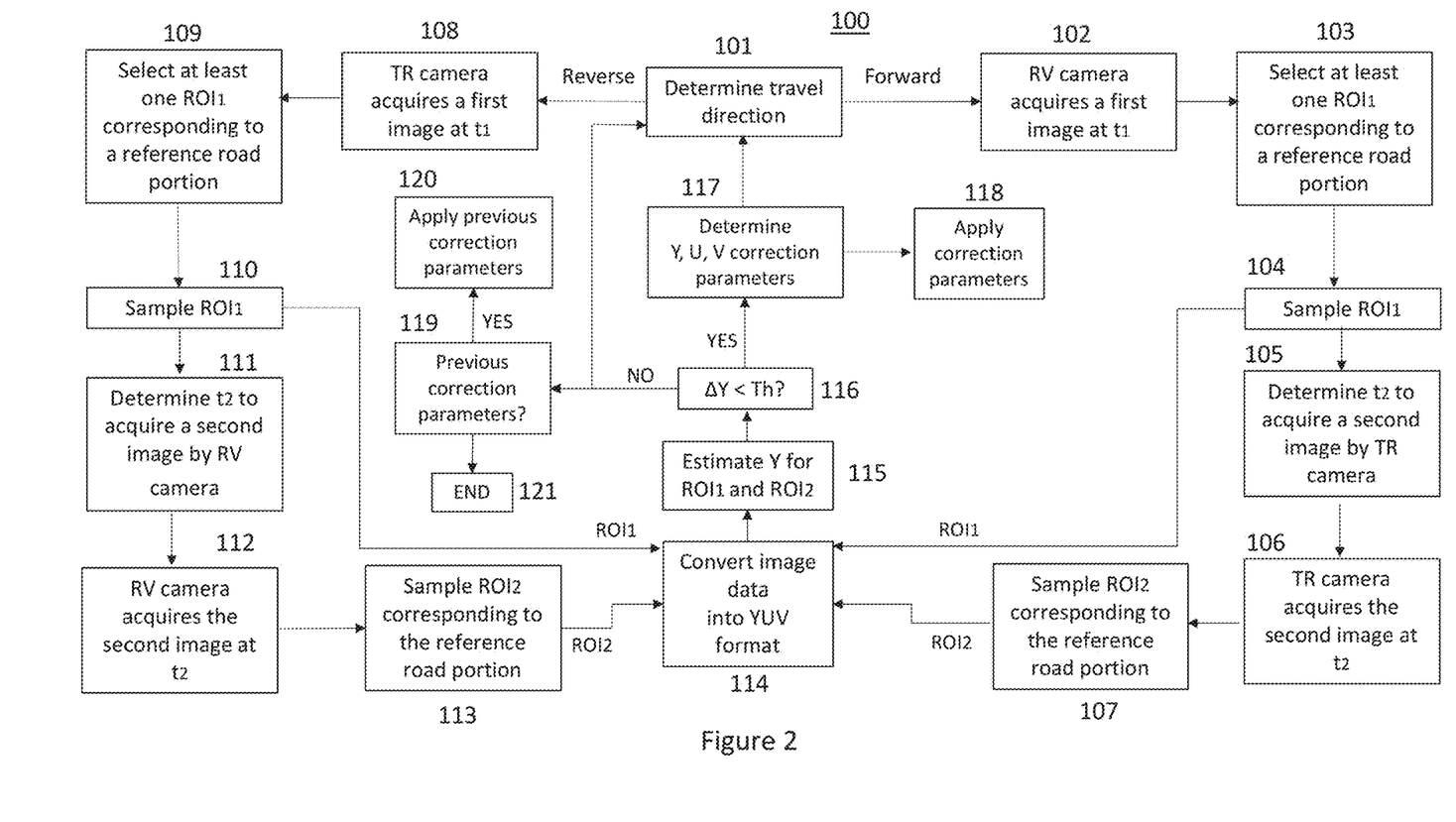
FIG. 2 illustrates a method according to the present invention, that can be performed by the multi-camera vision system of FIG. 1.

With reference now to FIG. 2, an image harmonization method 100 operable within the system is disclosed.

At method step 101, the travel direction of the car 11 is determined, by using for example the odometry sensors 17 and/or GPS location tracking information.

Figure 3A:
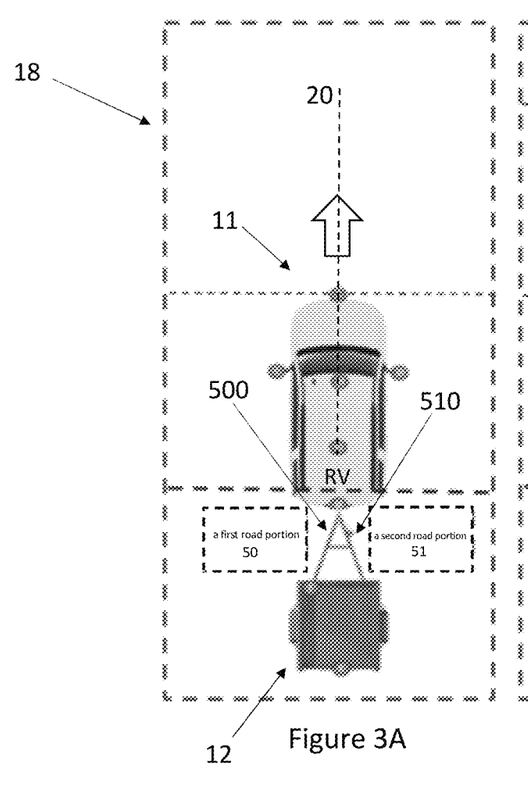
FIGS. 3A and 3B illustrate a vehicle proceeding along a forward direction.

With reference to FIG. 3A, a case is first considered where, at the determination of step 101, the car 11 is moving forward along a substantially straight direction indicated by the longitudinal axis 20. In FIG. 3A, the field of view $FOV_1$ of the RV camera covers a first road portion 50 and a second road portion 51 within the gap between the car 11 and the trailer 12, beside respectively a first side 500 and a second side 510 of the trailer drawbar 14. As such, these road portions 50, 51 are not occluded by the trailer 12 or drawbar 14 and therefore, can be captured by the RV camera and sampled as reliable reference road portions for the purpose of harmonizing the cameras FV, RV (as it will be disclosed in more detail). It is to be noted that in this application, a reference road portion encompasses not only paved road portion, but any portion of ground where the vehicle can have a uniform colour and texture (e.g. a portion of a highway, street, country road, pitch).

Figure 4A:
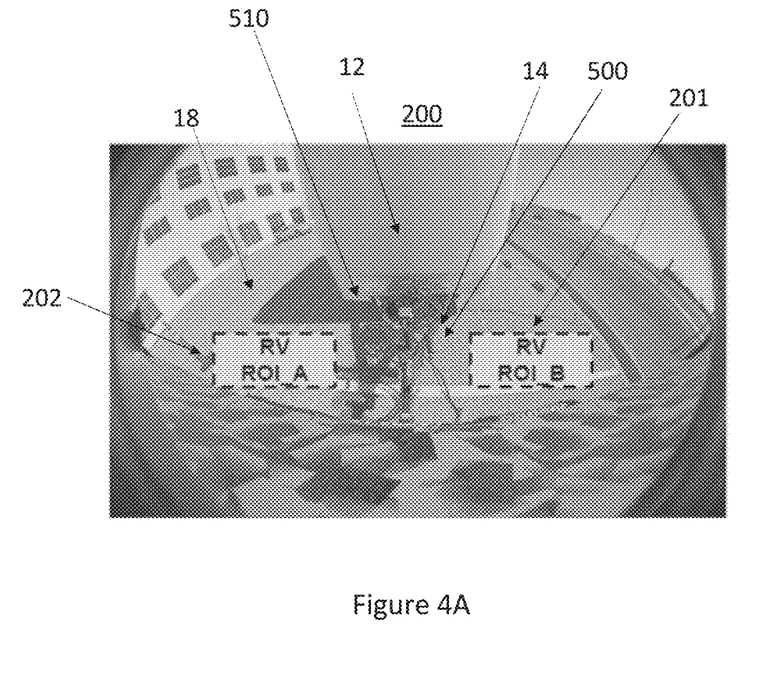
FIGS. 4A and 4B illustrate two images acquired respectively, according to the operation of the method of FIG. 2, by a vehicle camera RV and a trailer camera TR, as the vehicle proceeds as illustrated in FIGS. 3A and 3B.

Responsive to a determination that the car 11 is travelling along the forward direction illustrated in FIG. 3A, the RV camera is selected to acquire a first image at a first time, $t_1$, (step 102), corresponding to the position of the car 11 illustrated in FIG. 3A. FIG. 4A illustrates the image 200 acquired by the RV camera at $t_1$.

Then, two ROIs 201, 202 are selected to be sampled from the image 200 (step 103). In particular, the ROIs 201, 202 are positioned and dimensioned within the acquired image 200 in such a way as to correspond to the road portions 50 and 51, respectively, beside the drawbar 14.

One exemplary method to select the two ROIs 201, 202 is now disclosed.

When the vehicle ECU 15 receives the image 200 acquired at $t_1$, the ECU 15 is configured to check two ROIs 201, 202 where road portions beside the sides 500, 510 of the drawbar 14 are expected to be included, assuming that the trailer 12 is substantially aligned to the car 11 along a longitudinal axis.

For example, the ECU 15 is configured to define these ROIs 201, 202 by knowing an image area occupied by the trailer 12 and drawbar 14, when the trailer 12 is substantially aligned to the car 11. In one implementation, the ECU 15 can learn this area by detecting the trailer 12 and drawbar 14 within a set of images acquired by the RV camera and including the trailer 12 aligned with the car 11. This provides for a high degree of accuracy of ROI (position and size), however, it will be appreciated that this approach adds complexity in terms of implementation. Alternatively, the ECU 15 can estimate this area by knowing dimensional parameters of the vehicle 11 and drawbar 14 (e.g., at least the width of the vehicle 11 and the length of the drawbar 14). This information can be provided to the ECU 15 in various ways, including: receiving this information from a user's input, receiving a scan of the trailer 12 and drawbar 14, or obtaining vehicle CAD data possibly through a network connection. In any case, a default ROI position can be determined based on a known position of the camera RV on the vehicle 11 from the vehicle CAD, as well as a known width for the vehicle 11 (which can also be obtained from the vehicle CAD). This in turn indicates a shortest length for a suitable drawbar—these are supposed to be at least half as long as the vehicle width. This allows a default position for the ROIs to be determined with minimum user input and processing power required.

Then, the ECU 15 determines whether any of the checked ROIs 201, 202 includes a portion of the drawbar 14 or the trailer 12 (due to steering the car 11 at the image acquisition time $t_1$). In an embodiment, the ECU 15 applies image detection on the ROIs 201, 202 to detect whether any of these ROIs 201, 202 contains a portion of the drawbar 14 or the trailer 12. In another embodiment, the ECU 15 uses odometry data provided by the sensors 17 and/or GPS location information to measure a steering angle of the car 11 at the image acquisition time $t_1$, and compare the measured angle with a threshold. Responsive to a determination that the measured steering angle has a value below the threshold (including a null value), the ECU 15 determines that none of the ROIs 201, 202 contains a portion of the drawbar 14 or the trailer 12. In addition or as an alternative, a similar determination can be performed by the ECU 15 using a measured hitch angle between the longitudinal axes of the car 11 and the trailer 12. This angle can be detected in any number of ways, for example using image information from the acquired image 200 to detect a rotation of the trailer 12 around a vertical axis passing through the hitch 14. Equally, image information from the vehicle mirror cameras ML, MR can detect features from the surface of the trailer moving laterally within their respective fields of view to estimate the relative angle of the vehicle and trailer. Other techniques for determining the relative angle of the vehicle and trailer include using information from rear facing ultrasonic or radar sensors mounted to the rear of the vehicle 11 (where changing differences measured by the sensors signal changes in the relative angle of the car 11 and trailer 12).

With reference back to the image 200 illustrated in FIG. 4A, the ECU 15 determines that none of the checked ROIs 201, 202 contains a portion of the drawbar 14 or the trailer 12. Responsive to this determination, the ROIs 201, 202 are selected to be sampled from the image 200 (step 103).

It is to be further noted from FIG. 4A that the selected ROIs 201, 202 are defined to correspond to road portions 50, 51 that are separated from the respective sides 500, 510 of the drawbar 14 in such a way as to be minimally if at all affected by the shadow projected by the drawbar 14 (and by the trailer 12), at any time of the day and lighting condition.

With reference back to FIG. 3A, it is to be further appreciated that if at $t_1$ the car 11 is steering to the right, instead of moving forward along a straight trajectory, the steering angle can be such that only the road portion 50 beside the left side 500 of the drawbar 14 is viewable within an image acquired by the RV camera at $t_1$. Similarly, if at $t_1$ the car 11 is steering to the left, the steering angle can be such that only the road portion 51 beside the right side 510 of the drawbar 14 is viewable within an image acquired by the RV camera at $t_1$.

In these cases, the method step 103 includes selecting only one of the ROIs 201, 202, corresponding to the road portion 50, 51 that can be captured by the RV camera according to the steering direction.

In other embodiments, when the ECU 15 receives an image acquired by the RV camera at $t_1$, the ECU 15 can perform detection of the trailer 12 and drawbar 14 to determine the image area occupied by the trailer 12 and drawbar 14, and select accordingly one or more ROIs 201, 202 around the detected area that can include respective road portions 50, 51 beside the sides 500, 510 of the drawbar 14. In some other embodiments, the selection of the ROIs can be based on a detection of road portions within the captured scene, e.g., by using a texture-oriented method or by evaluating the pixel intensity.

Furthermore, although the above disclosed embodiments are based on sampling road portions 50, 51 beside the drawbar 14 from the image acquired by the RV camera at acquisition time $t_1$, it will be appreciated that, in addition or as an alternative, also road portions viewable within the field of view of the $FOV_1$ of the RV camera beside the trailer 12 can be sampled as references for image harmonization. In this case, the trailer's shadow projection on the road 18 is to be considered in the selection of the ROIs (as the trailer's shadow projection can cover one of the surrounding road portions depending on the orientation of the sun, as can be seen in FIG. 4A).

The description of method 100 now continues referring back to the case where the two ROIs 201, 202 are selected at method step 103 to be sampled from the image 200 illustrated in FIG. 4A. Nevertheless, the following disclosure applies also to the case where, at method step 103, only one ROI 201, 202 is selected (due to steering).

The selected ROIs 201, 202 are sampled from the image 200 (step 104) and the respective image data stored within a memory of the system or other storage means accessible by the system (e.g. a database or server that can be accessed by the system via network connection).

Then, at method step 105, a distance travelled by the car 11 after the acquisition time $t_1$ of image 200 is monitored to determine a second $t_2$ to acquire a second image by the TR camera of the trailer 12, in such a way that the same road portions 50, 51 corresponding to the ROIs 201, 202 sampled from the image 200 (acquired by the RV camera of the car 11) can be included in corresponding ROIs defined in the second image. The travelled distance can be monitored using the odometry data provided by the sensors 17 and/or GPS tracking information.

Figure 3B:
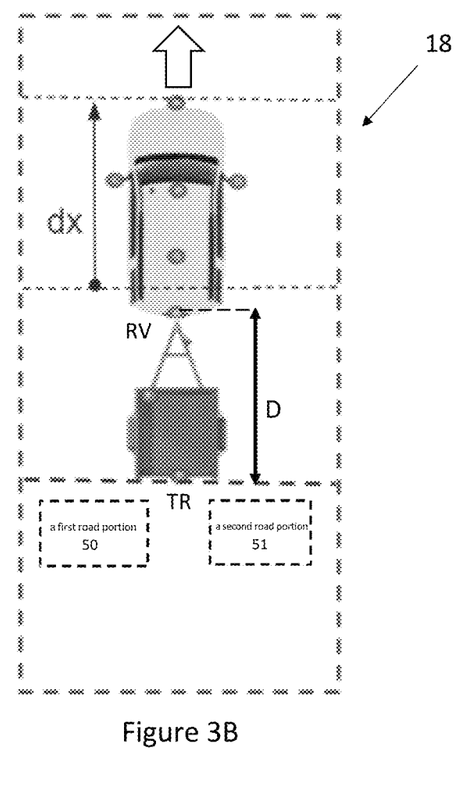

For example, FIG. 3B illustrates that the car 11 has moved further along to the forward direction from the position illustrated in FIG. 3A, covering a distance dx such that each of the road portions 50, 51 is viewable within the field of view $FOV_2$ of the TR camera (if not occluded by an object moving into the scene during the time for travelling distance dx).

Figure 4B:
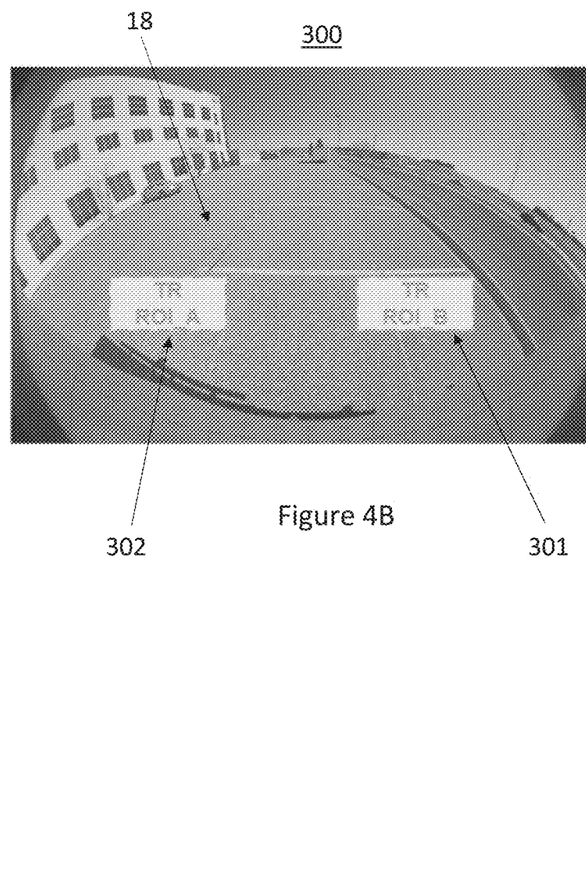

A time $t_2$ is determined, corresponding to travelled distance dx, and an image 300 is acquired by the TR camera at $t_2$ (step 106). The acquired image 300 is illustrated in FIG. 4B, including two ROIs 301, 302 where the road portions 50, 51 are expected to be included according to the travelled distance dx (since in the example of FIG. 4B no objects are occluding the road portions 50, 51, the ROIs 301, 302 actually include the road portions 50, 51).

With reference back to FIGS. 3A-3B, it is to be noted that when the cameras RV and TR are at the same height above the road surface and at the same relative angle to the road surface and have the same projection model, the travelled distance dx can be about equal to a distance D between the RV and TR cameras (that in turn substantially corresponds to a sum of the lengths of the trailer 12 and the drawbar 14). In this case, with reference to FIGS. 4B-4A, the ROIs 301, 302 can be defined at a position within the image 300 and with a pixel area that substantially correspond to the position within the image 200 and the pixel area of the ROIs 201, 202. This improves the comparability of the image data within the sampled ROIs 201, 202 with the image data within the sampled ROIs 301, 302. It will therefore be appreciated that if the relative positions, heights and/or projection models of the cameras RV and TR differ, then distance dx will need to change accordingly and/or the ROIs 201, 202 and 301, 302 will need to be mapped to one another differently.

In any case, the determined acquisition time $t_2$ for the TR camera can correspond to a travelled distance either greater or less than dx, as long as the road portions 50, 51 can still be viewable within the field of view $FOV_2$ of the TR camera.

After the acquisition of the image 300 at $t_2$, the ROIs 301, 302 are sampled (step 107), and the respective image data stored within the memory of the system (or other storage means accessible by the system).

With reference back to the initial method step 101, an operation of the method 100 is now disclosed in response to determining that the direction of the car 11 is a reverse direction.

Figure 5A:
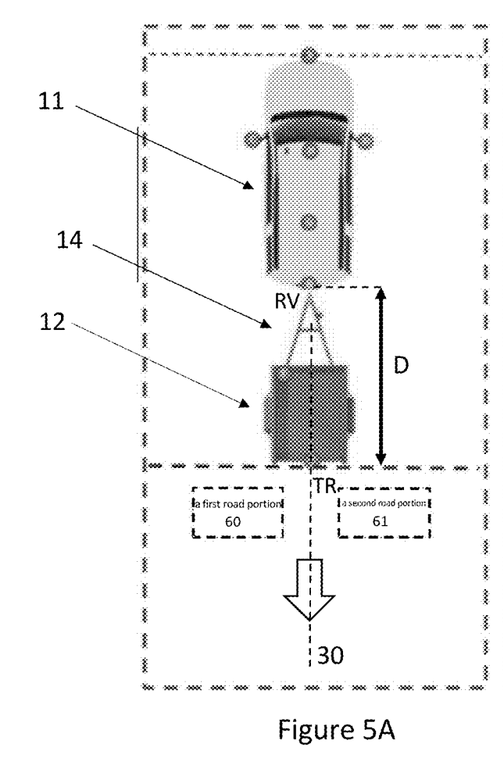
FIGS. 5A and 5B illustrate a vehicle proceeding along a reverse direction.
Figure 5B:
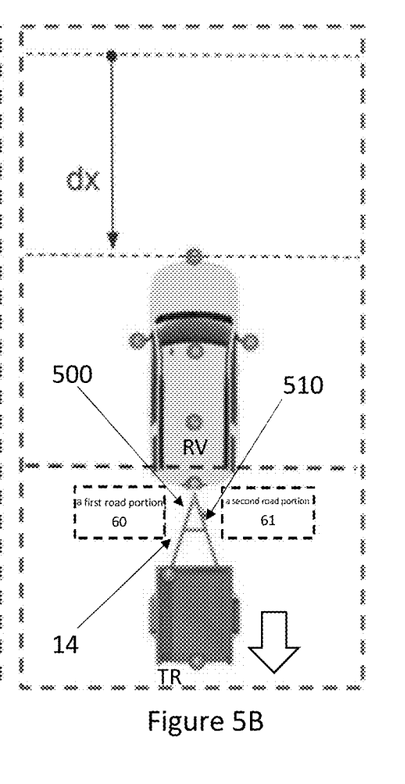

In particular, with reference to FIG. 5A, a case is considered where the car 11 is reversing along a substantially straight direction corresponding to the longitudinal axis 30, at the determination of step 101. In FIG. 5A, the field of view $FOV_2$ of the TR camera covers a first road portion 60 and a second road portion 61 within the gap between the car 11 and the trailer 12, that can become also viewable within the field of view $FOV_1$ of the RV camera beside the sides 500, 510 of the drawbar 14, as the car 11 proceeds in the reverse direction (as illustrated in FIG. 5B). As such, the road portions 60, 61 will be not occluded by the trailer 12 or the drawbar 14 and, therefore, can be sampled at different times by both the TR and RV cameras and used as reliable reference for image harmonization.

Figure 6A:
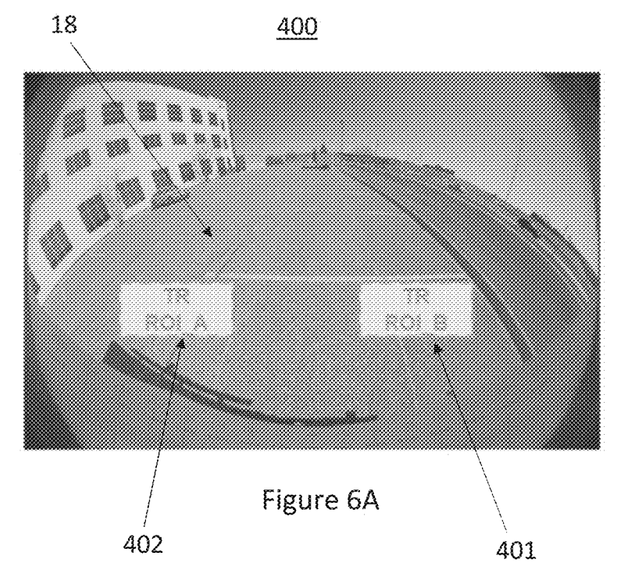
FIGS. 6A and 6B illustrate two images acquired respectively, according to the operation of the method of FIG. 2, by the trailer camera TR and the vehicle camera RV, as the vehicle proceeds as illustrated in FIGS. 5A and 5B.

Responsive to the determination that the car 11 is travelling along the reverse direction illustrated in FIG. 5A, the TR camera is selected to acquire a first image at a first time, $t_1$, (step 108), corresponding to the position of the car 11 illustrated in FIG. 5A. FIG. 6A illustrates an image 400 acquired by the TR camera at $t_1$.

Then, two ROIs 401, 402 are selected to be sampled from the image 400 (step 109). In particular, the ROIs 401, 402 are positioned and dimensioned within the acquired image 400 in such a way as to include the road portions 60 and 61.

One exemplary method to select the two ROIs 401, 402 is now disclosed.

When the vehicle ECU 15 receives the image 400 acquired at $t_1$, the ECU 15 is configured to check two ROIs 401, 402 corresponding to road portions that can be viewable by the RV camera beside the sides 500, 510 of the drawbar 14, assuming that the trailer 12 is substantially aligned to the car 11 along a longitudinal axis. For example, the ECU 15 is configured to define these ROIs 401, 402 by knowing the image area that is occupied by the trailer 12 and trailer drawbar 14, when the trailer 12 is substantially aligned with the car 11.

Then, the ECU 15 determines whether the car 11 is reversing along a substantially straight trajectory. For example, the ECU 15 uses the odometry data provided by the sensors 17 and/or GPS tracking information to measure a steering angle of the car 11 or a hitch angle between the car 11 and the trailer 12, at the image acquisition time $t_1$, and compare the measured angle with a threshold. Responsive to a determination that the measured steering angle or hitch angle has a value below the threshold (including a null value), the ECU 15 determines that the car 11 is reversing along a straight direction. Responsive to this determination, the ECU selects the two ROIs 401, 402 to be sampled from the image 400.

With reference back to FIG. 5A, it is to be appreciated that if at $t_1$ the car 11 is reversing while steering to the right, instead of reversing along a straight trajectory, the steering angle can be such that only the road portion 60 can become viewable within the field of view $FOV_1$ of the RV camera, beside the side 500 of the drawbar 14, as the car 11 proceeds in the reversing direction. Similarly, if at $t_1$ the car 11 is reversing while steering to the left, instead of reversing along a straight trajectory, the steering angle can be such that only the road portion 61 can become viewable within the field of view $FOV_1$ of the RV camera, beside the side 510 of the drawbar 14, as the car 11 proceeds in the reversing direction.

In these cases, the method step 109 includes selecting only one of the ROIs 401, 402, corresponding to the road portion 60, 61 that can be captured also by the RV camera according to the steering direction.

The description of method 100 now continues referring back to the case where two ROIs 401, 402 are selected, at method step 109, to be sampled from the image 400 illustrated in FIG. 6A. Nevertheless, the following disclosure applies also to the case where only one ROI is selected to be sampled at method step 109 (because of steering).

The ROIs 401, 402 are sampled from the image 400 (step 110) and the respective image data stored within the memory of the system (or other storage means accessible by the system).

Then, at method step 111, a distance travelled by the car 11 after the acquisition time $t_1$ of image 400 is monitored to determine a second time $t_2$ to acquire a second image by the RV camera of the car 11, such that the road portions 60, 61 corresponding to the ROIs 401, 402 sampled from the image 400 (acquired by the TR camera) can be included in corresponding regions of interest defined in the second image.

For example, FIG. 5B illustrates that the car 11 has moved further along to the reverse direction from the position illustrated in FIG. 5A, covering a distance dx such that the road portions 60, 61 are each viewable within the field of view $FOV_1$ of the RV camera (if not occluded by an object moving into the scene during the time for travelling distance dx). A time $t_2$ is determined, corresponding to travelled distance dx, and an image 600 is acquired by the RV camera at $t_2$ (step 112).

Figure 6B:
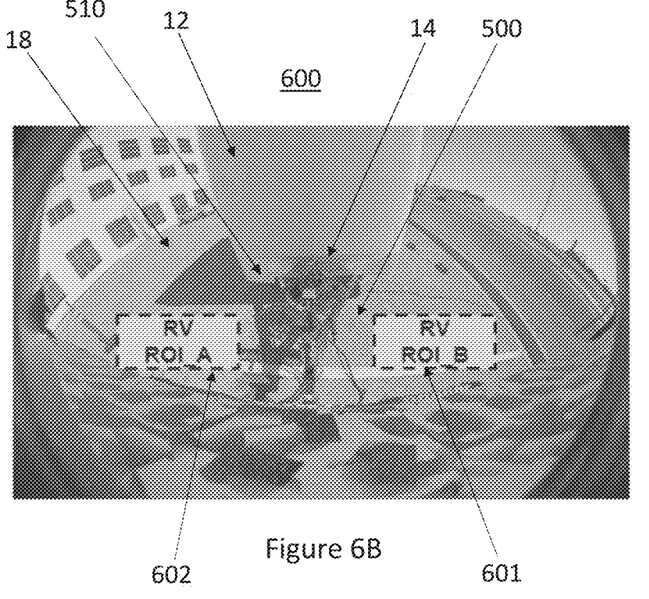

The acquired image 600 is illustrated in FIG. 6B, and includes two ROIs 601, 602 beside the sides 500, 510 of the imaged drawbar 14, where the road portions 60, 61 are expected to be included according to the travelled distance dx (since in the example illustrated in FIG. 6B no objects are occluding the road portions 60, 61, the ROIs 601, 602 actually include these portions 60, 61).

With reference back to FIGS. 5A-5B, it is to be noted that the road portions 60, 61 are captured, at $t_1$, by the TR camera at a close acquisition distance that is about the acquisition distance between the same road portions 60, 61 and the RV camera, at $t_2$. In this way, the possibility of having an object occluding one of the portions 60, 61 at $t_1$ is reduced. Furthermore, with reference to FIGS. 6A-6B, the ROIs 401, 402 are defined at a position within the image 400 and with a pixel area that substantially corresponds to the position within the image 600 and the pixel area of the ROIs 601, 602.

The method 100 then proceeds by sampling the ROIs 601, 602 from the image 600 (step 113), and the respective image data are stored within the memory of the system (or other storage means accessible by the system).

A harmonization process according to the execution of the method 100 is now disclosed for simplicity only with reference to the ROIs 201, 202, 301, 302 sampled as per the operation of steps 102-107 of the method 100 (following the determination of a forward direction at initial step 101). It is to be noted that the principles of this disclosure equally apply to the operation of the harmonization process based on the ROIs 401, 402, 601, 602 sampled as per the operation of steps 108-113 of the method 100 (following the determination of a reverse direction at initial step 101).

The image data of the sampled ROIs 201, 202 (extracted from the image 200 acquired by the RV camera at $t_1$) and the image data of the sampled ROIs 301, 302 (extracted from the image 300 acquired by the TR camera at $t_2$) are retrieved from the memory of the system (or other storage means accessible by the system) and provided to a harmonisation network (that can be implemented by the vehicle ECU 15 or another processing unit of the system), where the retrieved image data are converted into a YUV format (step 114) if this has not been done already.

Then, luminance components $Y_1$ and $Y_2$ are estimated from the pixel data of the ROIs 201, 202, as well as luminance components $Y_3$ and $Y_4$ being estimated from the pixel data of the ROIs 301, 302 (step 115). Various methods can be used to estimate $Y_1$ to $Y_4$. For example, some techniques to estimate $Y_1$ to $Y_4$, based on histograms generated to describe the luminance of the ROIs 201, 202, 301, 302, are disclosed in WO2018/087348 referenced above (including a non-segmentation based approach, a histogram-segmentation based approach, and a bi-modal histogram segmentation approach).

Based on the appreciation that luminance values of different imaged objects are significantly different, a difference between the estimated $Y_1$ and $Y_3$ of the ROIs 201, 301 is compared to a threshold for the purpose of verifying whether both these ROIs 201, 301 include the same reference road portion 50 (step 116).

Responsive to a determination that the absolute value of $Y_1-Y_3$ is below the threshold, it is assumed that this minor difference is due to a lack of brightness harmonization between the RV and TR cameras. As such, the image data within the ROIs 201, 301 is verified to belong to the same reference road portion 50.

Responsive to a determination that the absolute value of $Y_1-Y_3$ exceeds the threshold, the image data within the ROIs 201, 301 is determined to belong to different imaged objects. For example, this can correspond to the case where an object (such as another vehicle or person) moved into the road portion 50 between the acquisition times $t_1$ and $t_2$ of the images 200, 300 from which the ROIs 201, 301 are extracted. In another case, an object can cover the road portion 50 at $t_1$, and move away from the portion 50 between the acquisition times $t_1$-$t_2$.

A similar verification is performed to verify whether both the two ROIs 202, 302 include the same reference road portion 51, by comparing a difference between $Y_2$ and $Y_4$ with the threshold (Step 116).

Responsive to a determination that the absolute value of at least one of the differences $Y_1-Y_3$ and $Y_2-Y_4$ is below the threshold, such a difference is used to determine correction parameters for harmonizing the brightness of images acquired by the RV camera of the car 11 and the TR camera of the trailer 12 (step 117). Various methods can be applied to determine the brightness correction parameters based on luminance difference values, such as the method disclosed in WO2018/087348. Once determined, the brightness correction parameters can be stored in the memory of the system (or any other storage means accessible by the system).

Furthermore, chrominance values $U_1$, $V_1$ and $U_2$, $V_2$ are estimated from the pixel data of the ROIs 201, 202, as well as chrominance values $U_3$, $V_3$ and $U_4$, $V_4$ being estimated from the pixel data of the ROIs 301, 302. The values of the differences $U_1-U_3$, $V_1-V_3$ are used to determine correction parameters for harmonizing the colour of images acquired by the RV and TR cameras (step 117). Various methods can be applied to determine the colour correction parameters based on luminance difference values, such as the method further disclosed in WO2018/087348. Once determined, the colour correction parameters can be stored in the memory of the system (or any other storage means accessible by the system).

In some embodiments, each of the differences $U1-U3$, $V1-V3$ is used to calculate colour parameters only upon verification that its value is below a threshold.

Furthermore, although the above disclosed embodiment is based on a comparison between Y, U, V values estimated for describing the whole data content of the ROIs 201, 202, 301, 302, in other embodiments the ROIs 201, 202, 301 can be divided in sub-regions for which respective Y, U, V are estimated and compared to determine the harmonization parameters. The subregions can correspond to single pixels or group of pixels within the ROIs 201, 202, 301, 302.

After calculation of the Y, U, V correction parameters, the method 100 can be re-executed at a later stage, starting again from step 101 to determine the direction of the car 11. For example, the system can be configured to initiate the method periodically (and/or triggered by a specific driving activity/environment condition). In this way the stored harmonization correction parameters are updated over time.

With reference back to method step 116, the method 100 is also re-executed after a determination that both the differences $Y1-Y3$ and $Y2-Y4$ have an absolute value exceeding the threshold (and this determination can trigger the re-execution of the method 100).

The determined harmonization correction parameters can then be retrieved by the system, when required to be applied (step 118) in the process of generating a combined view included merged images acquired by the RV and TR cameras, such as an invisible trailer view to be displayed on the main display 22 of the car 11 or on a windscreen that provides a digital rear mirror. In some embodiments, the harmonization correction parameters are applied to at least one of the images acquired by the RV and TR cameras before these images are merged into the combined view. In other embodiments, the harmonization correction parameters are applied to the combined view, particularly in the merging region between the images acquired by the RV and TR cameras.

Figure 7:
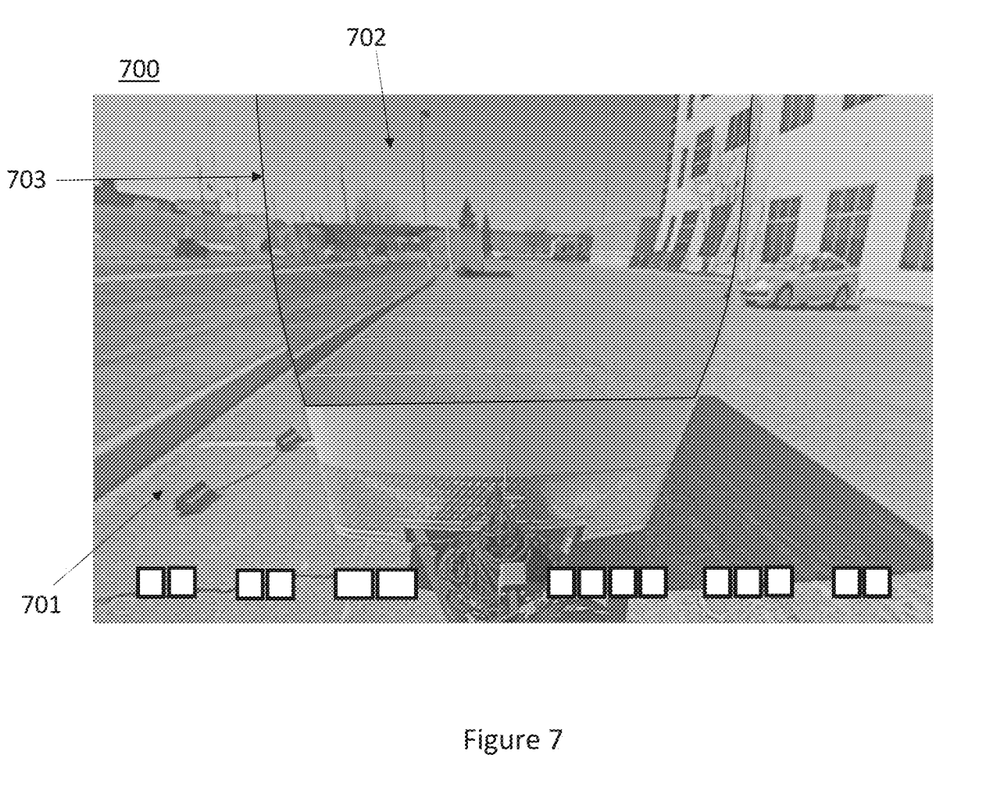
FIG. 7 illustrates a displayed merged invisible trailer view, harmonized according to the operation of the method of FIG. 2.

FIG. 7 illustrates an exemplary displayed image 700 of an invisible trailer view harmonized using the correction parameters determined according to the operation of the disclosed method 100, where an image 701 acquired by the TR camera is merged to an image 702 acquired by the RV camera along a line 703 (without blending, due a spatial gap between the acquired images). The row of boxes at the bottom of the view correspond to various buttons or widgets of a user interface for an application controlling the display and forming part of the vision system. Where the display comprises a touch screen, these widgets can be interactive, allowing the driver to directly select the function indicated by a respective widget.

Other combined views can benefit from applying the harmonization correction parameters obtained by the operation of method 100, such as a top view of the environment surrounding the trailer 12, that can be displayed on the display 22 and used to perform autonomous or semi-autonomous operations, or provide a footage that can be stored and retrieved at a later stage (e.g. for investigation after an accident, or theft of the trailer's content).

With reference back to method step 116, if both the differences $Y_1-Y_3$ and $Y_2-Y_4$ are determined to have an absolute value exceeding the threshold, no updated harmonization parameters are available to the system to harmonize a combined view. Thus, the system can determine whether correction parameters previously generated and stored according to the operation of method 100 are available (step 119). Responsive to a positive determination, the system can apply the previous correction parameters to harmonize the combined view (step 120). Responsive to a negative determination (e.g., because only one iteration of the method 100 has been performed or the previous parameters are not retrievable), no harmonization is applied (step 121—and in this case, the negative determination can trigger the re-execution of the method 100).

Although the execution of the method 100 has been disclosed to harmonize the RV and TR cameras of the car 11 and the trailer 12, the same principles can be similarly applied to harmonize the front FV camera and rear camera RV of the car 11 (or other vehicle, with or without a trailer), based on sampling the same road portions by the FV and RV cameras as the car 11 travels along a travel direction, and using the sampled road portions as common reference for harmonization.

The invention claimed is:

1. An image processing method for harmonizing images acquired by a first camera and a second camera connected to a vehicle and arranged in such a way as their fields of view cover a same road space at different times as the vehicle travels along a travel direction, the method comprising:
   determining the travel direction of the vehicle;
   based on the travel direction, selecting one of the first and second cameras to acquire a first image;
   acquiring, by the selected camera, the first image at a first time;
   selecting at least one first region of interest of the first image, the first region of interest potentially bounding a road portion;
   sampling the at least one first region of interest from the first image;
   monitoring a distance travelled by the vehicle along the travel direction after the first time to determine a second time to acquire, by the other camera, a second image, in such a way that the potential road portion is included in a second region of interest of the second image;
   acquiring, by the other camera, the second image at the second time;
   sampling the second region of interest from the second image;
   verifying whether both the first and second regions of interest include a road portion; and
   responsive to a verification that both the first and second regions of interest include the road portion, determining one or more correction parameters for harmonizing images acquired by the first and second cameras, based on a comparison between the image content of the first and second regions of interest.

2. The method of claim 1, wherein the first camera is a rear camera of the vehicle and the second camera is a rear camera of a trailer connected to the vehicle via connecting means.

3. The method of claim 2, where in response to determining that the vehicle is travelling in a forward direction, selecting the first camera to acquire the first image at the first time, and wherein the or each at least one first region of interest of the first image corresponds to a region known to comprise a road space between the trailer and the vehicle.

4. The method of claim 3, wherein the or each at least one first region of interest of the first image is beside a region bounding the connecting means.

5. The method of claim 4, wherein selecting the at least one first region of interest comprises:
defining at least two first regions of interest in the first image, one at a first side of the region bounding the connecting means, and the other at a second side of the region bounding the connecting means, when the trailer is aligned to the vehicle along a longitudinal axis;
determining whether any of the two first regions of interest includes a portion of at least one of the trailer and the connecting means;
responsive to a determination that none of the two first regions of interest include a portion of at least one of the trailer and the connecting means, selecting both the two first regions of interest to be sampled from the first image; and
responsive to a determination that one of the two first regions of interest includes a portion of at least one of the trailer and the connecting means, selecting the other first region of interest to be sampled from the first image.

6. The method of claim 5, wherein determining whether any of the first two regions of interest includes a portion of at least one of the trailer and the connecting means comprises:
detecting whether a portion of at least one of the trailer and the connecting means is included in any of the first two regions of interest.

7. The method of claim 5, comprising:
measuring at least one of: a steering angle of the vehicle; and a hitch angle between the vehicle and the trailer; and
wherein determining whether any of the two first regions of interest includes a portion of at least one of the trailer and the connecting means is based on the at least one measured steering angle and hitch angle.

8. The method of claim 2, wherein in response to determining that the vehicle is travelling in a reverse direction, selecting the second camera to acquire the first image at the first time.

9. The method of claim 8, wherein the potential road portion corresponding to the at least one first region of interest of the first image becomes viewable within the field of view of the first camera as the vehicle travels in the reverse direction.

10. The method of claim 9, wherein selecting the at least one first region of interest of the first image comprises:
defining at least two first regions of interest, one to include a corresponding first road portion that can become viewable within the field of view of the first camera at a first side of the region bounding the connecting means, and the other at a second side of the region bounding the connecting means, when the trailer is aligned to the vehicle along a longitudinal axis;
measuring at least one of: a steering angle of the vehicle; and a hitch angle between the vehicle and the trailer;
in response to determining that the at least one measured steering angle and hitch angle is below a threshold, selecting both the two first regions of interest to be sampled from the first image; and
in response to determining that the at least one measured steering angle and hitch angle exceeds the threshold, selecting one of the two regions of interest based on the at least one measured steering angle and hitch angle.

11. The method of claim 1, wherein the first camera and the second camera are a front camera and a rear camera of the vehicle.

12. The method of claim 1, comprising:
converting the image data within the first and second regions of interest into a YUV format;
wherein determining whether both the first and second regions of interest include the road portion comprises:
estimating at least one first luma component from at least a portion of the image data within the first region of interest, and at least one second luma component from at least a portion of the image data within the second region of interest;
comparing the difference between the estimated first and second luma components with a threshold; and
responsive to a determination that the difference is below the threshold, verifying that both the first and second regions of interest include the road portion.

13. The method of claim 12, further comprising responsive to the verification that both the first and second regions of interest include the road portion:
determining one or more brightness correction parameters for harmonizing brightness of images acquired by the first and second cameras, based on the difference between the estimated first and second luma components;
estimating first chrominance components from at least a portion of the image data within the first region of interest and second chrominance components from at least a portion of the image data within the second region of interest; and
determining one or more chrominance correction parameters for harmonizing the colour of images acquired by the first and second cameras, based on a difference between the estimated first and second chrominance components.

14. The method of claim 1, further comprising:
generating a combined view including merged images acquired by the first and second cameras, including applying the determined one or more harmonization correction parameters.

15. An automotive multi-camera vision system comprising:
first and second cameras connected to a vehicle and arranged in such a way as their fields of view cover a same road space at different times as the vehicle travels along a travel direction; and
one or more processing units configured to perform the method of claim 1.

16. A combination of a vehicle and a trailer, comprising: the multi-camera vision system of claim 15, wherein the first camera is the rear camera of the vehicle and the second camera is the rear camera of the trailer.

* * * * *